UNITED STATES PATENT OFFICE.

JOHN P. FIXMER AND CORNELIUS A. JANSSEN, OF SPRINGFIELD, ILLINOIS; SAID JANSSEN ASSIGNOR TO SAID FIXMER.

IMPROVEMENT IN MEDICINAL COMPOUNDS.

Specification forming part of Letters Patent No. 193,326, dated July 24, 1877; application filed February 9, 1876.

*To all whom it may concern:*

Be it known that we, JOHN P. FIXMER and CORNELIUS A. JANSSEN, of the city of Springfield, in the county of Sangamon and State of Illinois, have invented a new and useful Medical Compound; and we do hereby declare that the following is a full and exact description of the same.

The object we have in view is the production of a medical compound to be used as a tonic, and for the cure of fever and ague, liver-complaint, neuralgia, and bilious diseases generally.

The ingredients used and their proportions are as follows: Alcohol, fifteen (15) gallons; water, thirty-three (33) gallons; bitter-apple, (colocynth,) eighteen (18) pounds; sugar, twenty (20) pounds; gentian-root, twelve (12) pounds; orange-peel, six (6) pounds; cascarilla-bark, three (3) pounds; curcuma, three (3) pounds; anise-seed, three (3) pounds; cassia, two (2) pounds; rhubarb-root, one and one-half (1½) pound; cloves, one (1) pound.

In the preparation of this medicine we take the bitter-apple, gentian-root, orange-peel, cascarilla-bark, curcuma, and rhubarb, all well pulverized, and allow them to stand in the alcohol fourteen (14) days. The liquor is then strained off, and to this liquor is added the sugar, water, anise-seed, cassia, and cloves.

The proportions of ingredients, as well as the manner of preparing them, may be changed to some extent without departing from the nature and scope of our invention, it being understood that the proportions named we prefer to use in the manufacture of our medicine.

Having thus described our invention, what we claim as new therein, and desire to secure by Letters Patent, is—

The medical compound described, consisting of water, alcohol, sugar, bitter-apple, gentian-root, orange-peel, cascarilla-bark, curcuma, anise seed, cassia, rhubarb, and cloves, prepared in about the proportions set forth.

This specification signed and witnessed this 5th day of February, 1876.

JOHN P. FIXMER.
CORNELIUS A. JANSSEN.

Witnesses:
SAMUEL D. SCHOLES,
T. C. MATHEW.